(12) United States Patent
Jones-McFadden et al.

(10) Patent No.: US 10,264,049 B2
(45) Date of Patent: Apr. 16, 2019

(54) SYSTEM FOR FACILITATING UTILIZATION OF RESOURCES

(71) Applicant: BANK OF AMERICA CORPORATION, Charlotte, NC (US)

(72) Inventors: Alicia C. Jones-McFadden, Fort Mill, SC (US); Joseph Benjamin Castinado, North Glenn, CO (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 177 days.

(21) Appl. No.: 15/167,032

(22) Filed: May 27, 2016

(65) Prior Publication Data

US 2017/0346710 A1    Nov. 30, 2017

(51) Int. Cl.
*G06F 13/00* (2006.01)
*H04L 29/08* (2006.01)
*G06Q 40/00* (2012.01)

(52) U.S. Cl.
CPC ............. *H04L 67/02* (2013.01); *G06Q 40/00* (2013.01)

(58) Field of Classification Search
CPC ... H04L 29/08072; H04L 29/06; H04L 43/00; H04L 12/2602; H04L 41/22; H04L 67/02; G06Q 20/10; G06Q 40/00; G06Q 20/102; G06Q 20/04; G06Q 40/02
USPC ............................................ 705/39; 709/224
See application file for complete search history.

(56) References Cited

U.S. PATENT DOCUMENTS

2014/0046830 A1\*  2/2014  Orozco .............. G06Q 20/4016
                                                                705/39

\* cited by examiner

*Primary Examiner* — Robert B Harrell
(74) *Attorney, Agent, or Firm* — Michael A. Springs; Moore & Van Allen PLLC; Nicholas C. Russell

(57) ABSTRACT

A system for monitoring resource utilization and electronic validation includes an entity system having a network communication interface and a memory device storing a resource monitoring and utilization application and a resource application. A processing device is operatively coupled to the memory device, wherein the processing device is configured to execute computer-readable program code to: determine based on the utilization of the resource application to initiate the resource monitoring and utilization application; initiate the resource monitoring and utilization application; and transmit an electronic validation that a transaction executed by the resource application is complete.

20 Claims, 7 Drawing Sheets

SYSTEM FOR FACILITATING UTILIZATION OF RESOURCES

BACKGROUND

Systems for providing on-line and/or mobile transactions are known where a user may engage in a wide variety of different types of transactions with entity systems with which the user has a relationship, such as financial institution systems. The on-line and/or mobile transactions are typically instituted via applications that are accessed from a user device that is in communication with the systems over a network.

BRIEF SUMMARY

Embodiments of the present invention provide an innovative system, method and apparatus for monitoring resource utilization and electronic validation.

In some embodiments an entity system comprises a system for monitoring resource utilization and electronic validation includes an entity system having a network communication interface and a memory device storing a resource monitoring and utilization application and a resource application. A processing device is operatively coupled to the memory device, wherein the processing device is configured to execute computer-readable program code to: determine based on the utilization of the resource application to initiate the resource monitoring and utilization application; initiate the resource monitoring and utilization application; and transmit an electronic validation that a transaction executed by the resource application is complete.

The resource utilization monitoring and validation application may detect and track utilization of the resource application. The resource application may comprises an online/mobile banking application. The resource utilization monitoring and validation application may apply logic rules to determine if a predetermined condition is met. The predetermined condition may be based on individual user data. The predetermined condition may be based on aggregated user data. The resource utilization monitoring and validation application may establish a communication channel between the entity system and a user device. The communication channel may transmit on-line content from the entity system to the user device. Contact information for a financial center may be delivered to the user device based on the location of the user device. A financial center may be provided remote access to the user device. The resource utilization monitoring and validation application may transmit transaction information to the financial center usable by the financial center to complete a transaction at the financial center.

In some embodiments a method for monitoring utilization of a resource, the method comprising: detecting and tracking at an entity system utilization of a resource application at a user device; determining, based on the utilization of the resource application, to initiate the resource monitoring and utilization application; initiating the resource monitoring and utilization application; and transmitting an electronic validation that a transaction of the resource application is complete.

The method may apply logic rules to determine if a predetermined condition is met where the predetermined condition is based on individual user data. The resource application may comprise an online/mobile banking application and the entity system comprises a financial institution system. The method may comprise establishing a communication channel between the entity system and the user device. The method may comprise communicating on-line content from the entity system to the user device. The method may comprise transmitting contact information for a financial center to the user device based on the location of the user device. The method may comprise transmitting transaction information from the entity system to the financial center usable by the financial center to complete a transaction at the financial center. The method may comprise providing remote access to the user device to the entity system. The method may comprise transmitting an electronic validation message from the entity system to the user device confirming a transaction executed by the resource application.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

In accordance with embodiments of the invention, the terms "financial institution" and "financial entity" include any organization that processes financial transactions including, but not limited to, banks, credit unions, savings and loan associations, investment companies, stock brokerages, asset management firms, insurance companies and the like.

Figure 1:
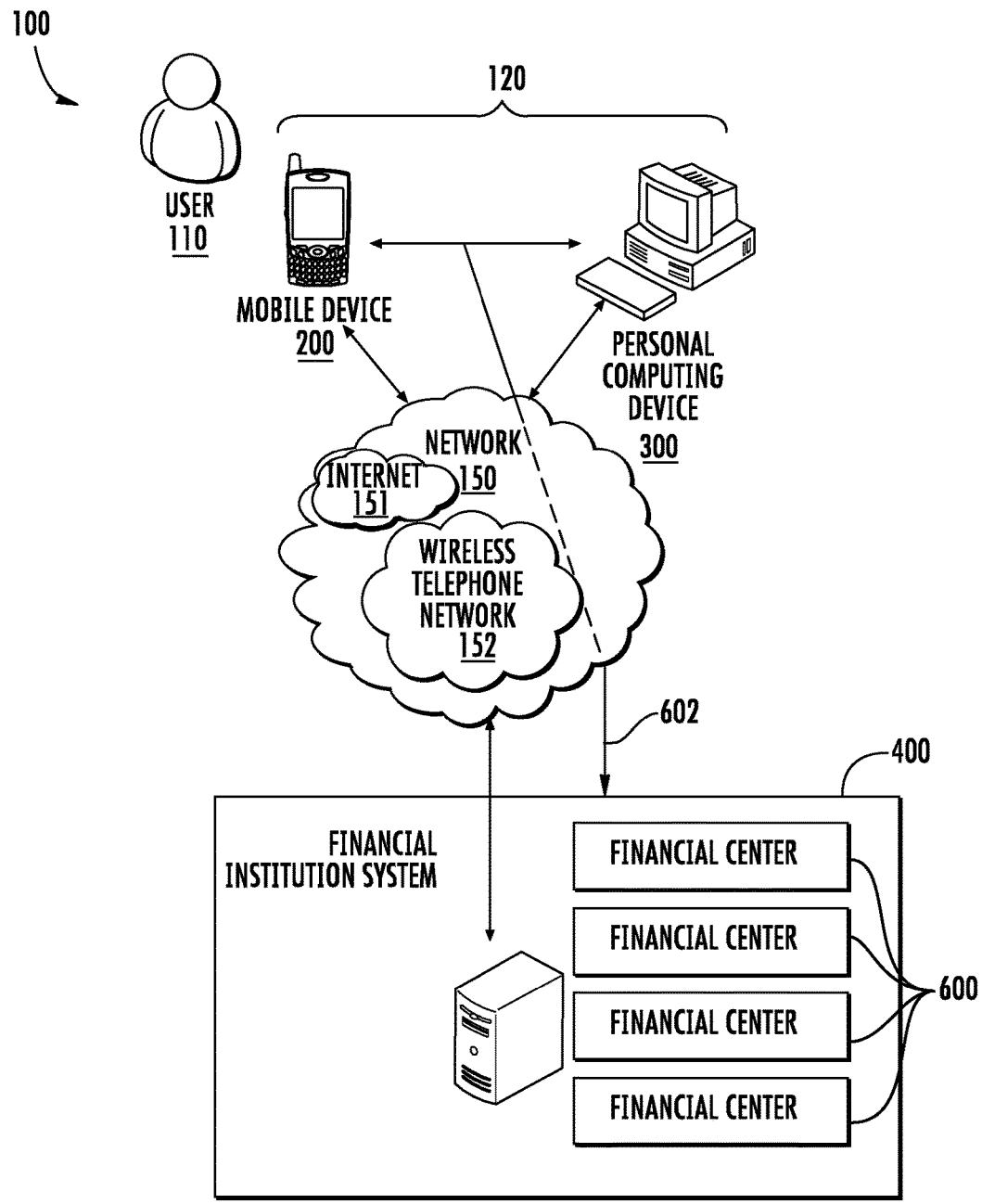
FIG. 1 is a block diagram illustrating a system for monitoring resource utilization and electronic validation, in accordance with embodiments of the invention.

FIG. 1 provides a block diagram illustrating an environment 100 for a system for monitoring resource utilization and electronic validation, in accordance with an embodiment of the invention. As illustrated in FIG. 1, the environment 100 includes a user 110 where the user represents a customer having a relationship with at least one but typically more than one financial institution. A user of the system may be a person, but may also be a business or any other entity. In a typical environment a great number of users may access the system of the invention.

The environment 100 also may include a plurality of user devices. The user devices may comprise any machine, apparatus, system or the like that may be connected to and communicate over network 150. At least one of the devices may comprise a computing device 120 for use by the user 110. The computing device 120 may be any device that employs a processor and memory and can perform computing functions, such as a personal computing device 300 or a mobile device 200, that may be connected to or access network 150. The personal computing device 300 may comprise a personal computer such as a desk top computer, lap top computer, tablet or any type of personal computing device that may be connected to a network by landline or wireless access such as wireless local area network (WLAN) such as WiFi based on the Institute of Electrical and Electronics Engineers' (IEEE) 802.11 standards, Bluetooth short-wavelength UHF radio waves in the ISM band from 2.4 to 2.485 GHz or other wireless access technology. As used herein, the mobile device 200 may comprise any mobile communication device, such as a cellular telecommunications device (i.e., a cell phone or mobile phone), personal digital assistant (PDA), a mobile Internet accessing device, or other mobile device. A mobile device may connect to the network by a cellular telecommunications network or by WiFi, Bluetooth or other access technology. In some embodiments where, for example, the user is an institution the computing device 120 may comprise servers, access terminals, or the like.

The computing device 120 may be configured to communicate over network 150 with at least one entity system such as financial institution system 400 of an entity such as a financial institution. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet 151. In one embodiment, the network 150 may also include a wireless telephone network 152.

In general, the computing device 120 is configured to connect with the network 150 and may be used to log the user 110 into the financial institution system 400 of the financial institution. A user 110 in order to access the user's account(s) typically uses an online banking application and/or mobile banking application on the financial institution system 400 and must authenticate with the financial institution system 400. For example, logging into the financial institution system 400 generally requires that the user 110 authenticate his/her/its identity using a user name, a passcode, a cookie, a biometric identifier, a private key, a token, and/or another authentication mechanism that is provided by or for the user 110 to the financial institution system 400 via the computing device 120. In some embodiments the authentication system may be a tiered system that may require different levels of authentication based on conditions such as, for example, previous activity of the user over the network 150. For example, the tiered authentication system may have three levels of authentication—hard, medium and soft. Hard authentication may require that the user input a high level of authentication information such as a combination of password, user identification, answer to challenge questions, biometrics, random key number or the like. A hard authentication may be required when the user logs on from an unrecognized user device or where the user activity is not recognized by the system. A medium authentication level may require only a user identification and password. A medium level of authentication may be required where, for example, the user has already logged-in to the computing device 120 using an authentication procedure for the device such as a thumbprint or password. A soft authentication may require only a user identification such as user name. A soft level of authentication may be used, for example, where the user has already logged-in to the computing device 120 using an authentication procedure for the device such as a thumbprint or password and the user has performed activities on the user device that are recognized as "normal" activity for that user and/or the user device is in a recognized location for that user. Thus, the level of authentication required for accessing the banking application, whether online, mobile or in person, may be adjusted based on conditions, activity, functions or information received about or from the user.

In one embodiment, the invention may provide an application download server such that software applications that support the financial institution system 400 can be downloaded to the computing device 120. In some embodiments of the invention, the application download server is configured to be controlled and managed by one or more third-party data providers (not shown in FIG. 1) over the network 150. In other embodiments, the application download server is configured to be controlled and managed over the network 150 by the same entity or entities that maintains the financial institution system 400

Figure 2:
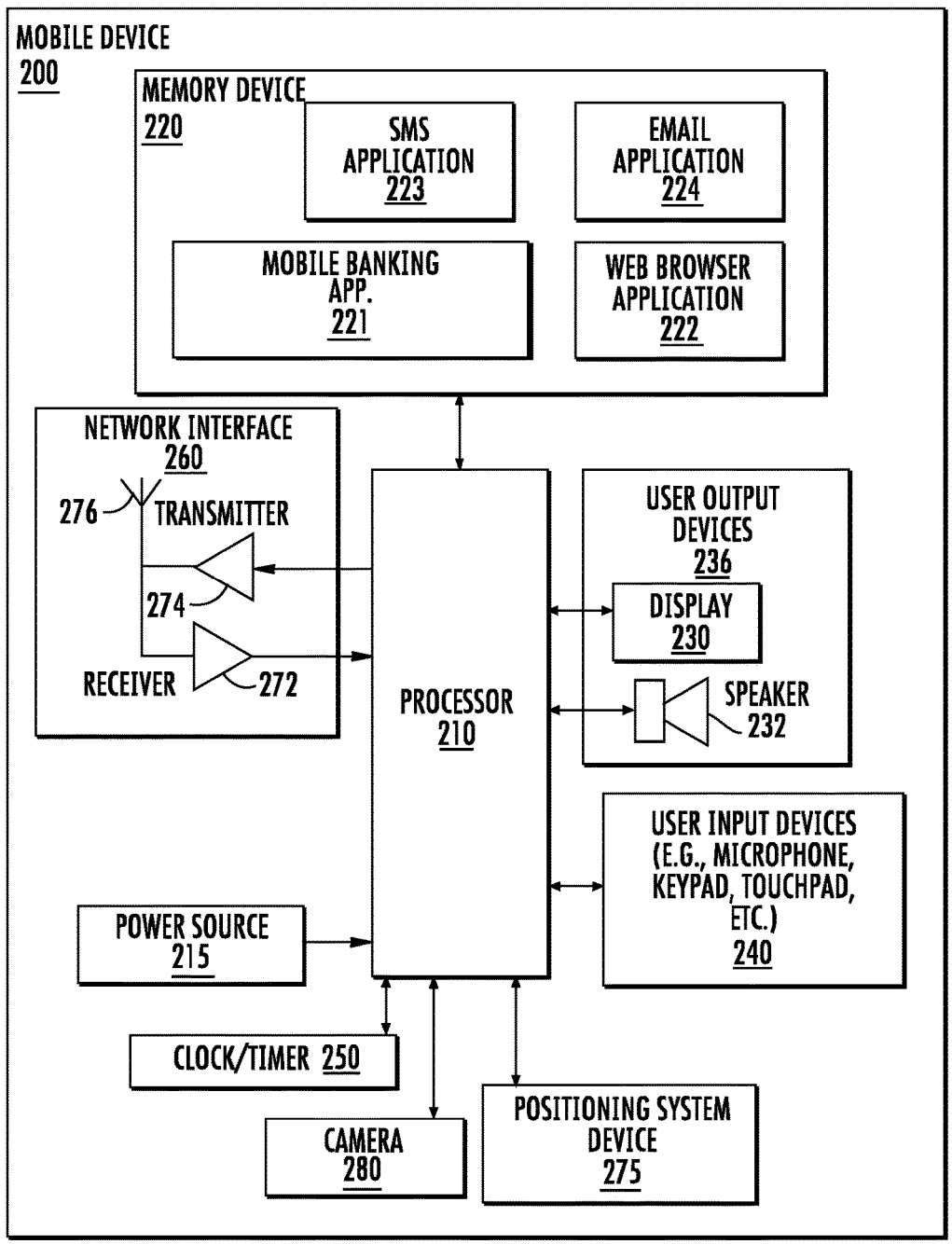
FIG. 2 is a block diagram illustrating the mobile computing device of FIG. 1, in accordance with embodiments of the invention.

FIG. 2 provides a block diagram illustrating a user's mobile device 200 of FIG. 1 in more detail, in accordance with embodiments of the invention. In one embodiment of the invention, the mobile device 200 is a mobile telephone. However, it should be understood that a mobile telephone and the embodiment of the mobile device 200 shown in FIG. 2 are merely illustrative of one type of mobile device 200 that may benefit from, employ, or otherwise be involved with embodiments of the present invention and, therefore, should not be taken to limit the scope of embodiments of the present invention. Other types of mobile devices 200 may include portable digital assistants (PDAs), pagers, tablets, mobile televisions, gaming devices, laptop computers, cameras, video recorders, audio/video player, radio, GPS devices, or any combination of the aforementioned.

Some embodiments of the mobile device 200 include a processor 210 communicably coupled to such devices as a memory device 220, user output devices 236, user input devices 240, and a network interface 260. The mobile device 200 further includes a power source 215, such as a battery, for powering various circuits and other devices that are used to operate the mobile device 200. Embodiments of the mobile device 200 may also include a clock or other timer 250 configured to determine and, in some cases, communicate actual or relative time to the processor 210 or one or more other devices. The mobile device 200 may also include a camera 280 and a positioning system device 275 such as a global positioning system (GPS). The processor 210, and other processing devices described herein, generally include circuitry for implementing communication and/or logic functions of the associated device. For example, the processor 210 may include a digital signal processor device, a microprocessor device, and various analog to digital converters, digital to analog converters, and/or other support circuits. Control and signal processing functions of the mobile device 200 are allocated between these devices according to their respective capabilities. The processor 210 thus may also include the functionality to encode and interleave messages and data prior to modulation and transmission. The processor 210 can additionally include an internal data modem. Further, the processor 210 may include functionality to operate one or more software programs, which may be stored in the memory device 220. For example, the processor 210 may be capable of operating a connectivity program, such as a web browser application 222. The web browser application 222 may then allow the mobile device 200 to transmit and receive web content, such as, for example, location-based content and/or other web page content, according to a Wireless Application Protocol (WAP), Hypertext Transfer Protocol (HTTP), and/or the like. The memory device 220 may include other applications such as e-mail app 224 and SMS app 223.

The processor 210 is configured to use the network interface 260 to communicate with one or more other devices on the network 150. In this regard, the network interface 260 includes an antenna 276 operatively coupled to a transmitter 274 and a receiver 272 (together a "transceiver"). The processor 210 is configured to provide signals to and receive signals from the transmitter 274 and receiver 272, respectively. The signals may include signaling information in accordance with the air interface standard of the applicable cellular system of the wireless telephone network 152. In this regard, the mobile device 200 may be configured to operate with one or more air interface standards, communication protocols, modulation types, and access types. By way of illustration, the mobile device 200 may be configured to operate in accordance with any of a number of first, second, third, and/or fourth-generation communication protocols and/or the like. For example, the mobile device 200 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Consolidated Mobile Telecommunications System (UMTS), CDMA2000, wideband CDMA (WCDMA) and/or time division-synchronous CDMA (TD-SCDMA), with fourth-generation (4G) wireless communication protocols, with LTE protocols, with 3GPP protocols and/or the like. The mobile device 200 may also be configured to operate in accordance with non-cellular communication mechanisms, such as via a wireless local area network (WLAN) or other communication/data networks.

As described above, the mobile device 200 has a user interface that may be made up of user output devices 236 and/or user input devices 240. The user output devices 236 include a display 230 (e.g., a liquid crystal display or the like) and a speaker 232 or other audio device, which are operatively coupled to the processor 210. The user input devices 240, which allow the mobile device 200 to transmit data, may include any of a number of devices allowing the mobile device 200 to transmit data, such as a keypad, keyboard, touch-screen, touchpad, microphone, mouse, joystick, other pointer device, button, soft key, and/or other input device(s).

The memory device 220 is operatively coupled to the processor 210. The memory device 220 can store any of a number of applications which comprise computer-executable instructions/code executed by the processor 210 to implement the functions of the mobile device 200 and/or one or more of the process/method steps described herein. The memory device 220 also includes a mobile banking application 221 that may be used to allow communication with a system such as the financial institution system 400 to implement the system of the invention. The use of the mobile banking application 221 may facilitate access to the system of the invention by providing log-in systems including user authentication systems, account information, system controls or the like. The mobile banking application 221 also allows communication to the financial institution to allow the user to set up and/or control the system of the invention.

These applications also typically provide a graphical user interface (GUI) on the display 230 that allows the user 110 to communicate with the mobile device 200, the financial institution system 400 and/or other devices or systems. The memory device 220 can also store any of a number of pieces of information, and data, used by the mobile device 200 and the applications and devices that make up the mobile device 200 or are in communication with the mobile device 200 to implement the functions of the mobile device 200 and/or the other systems described herein. For example, the memory device 220 may include such data as user authentication information.

Figure 3:
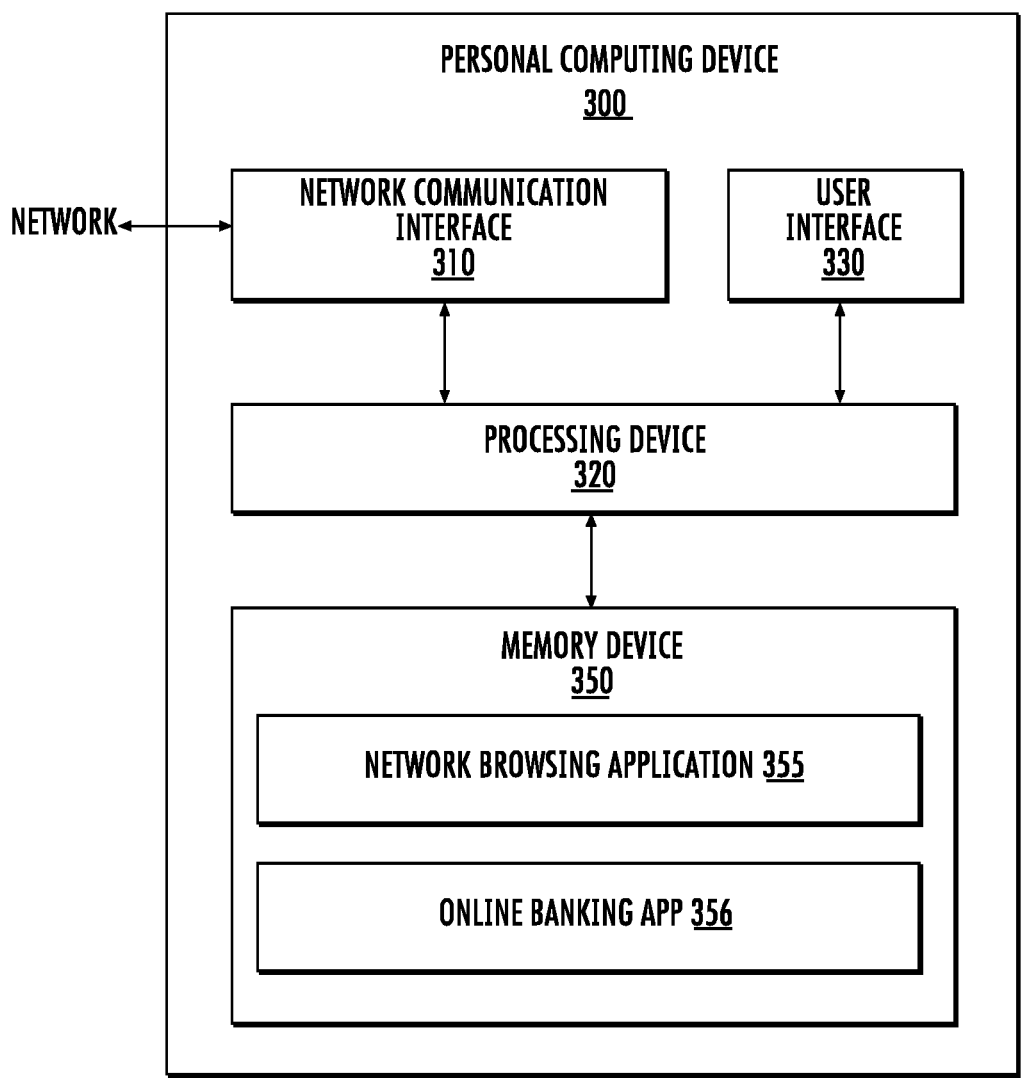
FIG. 3 is a block diagram illustrating the personal computing device of FIG. 1, in accordance with embodiments of the invention.

Referring now to FIG. 3, the personal computing device 300 also includes various features, such as a network communication interface 310, a processing device 320, a user interface 330, and a memory device 350. The network communication interface 310 includes a device that allows the personal computing device 300 to communicate over the network 150 (shown in FIG. 1). In one embodiment of the invention, a network browsing application 355 provides for a user to establish network communication with a financial institution system 400. The memory device 350 may include such applications as the conventional web browser application 355 and/or an on-line banking application 356. The on-line banking application 356 may be used to allow communication with the entity system such as financial institution system 400 to provide access to the financial institution system providing log-in systems including user authentication systems, account information or the like as previously described with respect to FIG. 2. The on-line banking application 356 also allows communication to the financial institution system 400 to allow the user to set up and/or control the system of the invention.

As used herein, a "processor" or "processing device," such as the processing device 320, processor device 420 and processor 210, generally refers to a device or combination of devices having circuitry used for implementing the communication and/or logic functions of a particular system. For example, a processing device or processor may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device or processor may further include functionality to operate one or more software programs based on computer-executable program code thereof, which may be stored in memory device. As the phrase is used herein, a processor or processing device may be "configured to" perform a certain function in a variety of ways, including, for example, by having one or more general-purpose circuits perform the function by executing particular computer-executable program code embodied in computer-readable medium, and/or by having one or more application-specific circuits perform the function.

As used herein, a "user interface" generally includes a plurality of user input and output devices and/or software that allow a customer to input commands and data to direct the processing device to execute instructions and to receive communications from the computing devices 120. For example, the user interface 330 presented in FIG. 3 may include a graphical user interface (GUI) or an interface to input computer-executable instructions that direct the processing device 320 to carry out specific functions. The user interface 330 employs certain user input and user output devices as previously described with reference to FIGS. 1 and 2. These input and output devices may include a display, mouse, keyboard, button, touchpad, touch screen, microphone, speaker, LED, light, joystick, switch, buzzer, bell, and/or other user input/output device for communicating with one or more users.

As used herein, a "memory" or "memory device" generally refers to a device or combination of devices that store one or more forms of computer-readable media for storing data and/or computer-executable program code/instructions. Computer-readable media is defined in greater detail below. For example, in one embodiment, the memory devices described herein include any computer memory that provides an actual or virtual space to temporarily or permanently store data and/or commands provided to the processing device when the processing device carries out its functions described herein. As used herein, "memory" or "memory device" includes any computer readable medium (as defined herein below) configured to store data, code, or other information. The memory 220 may include volatile memory, such as volatile Random Access Memory (RAM) including a cache area for the temporary storage of data. The memory may also include non-volatile memory, which can be embedded and/or may be removable. The non-volatile memory can additionally or alternatively include an electrically erasable programmable read-only memory (EEPROM), flash memory or the like.

Figure 4:
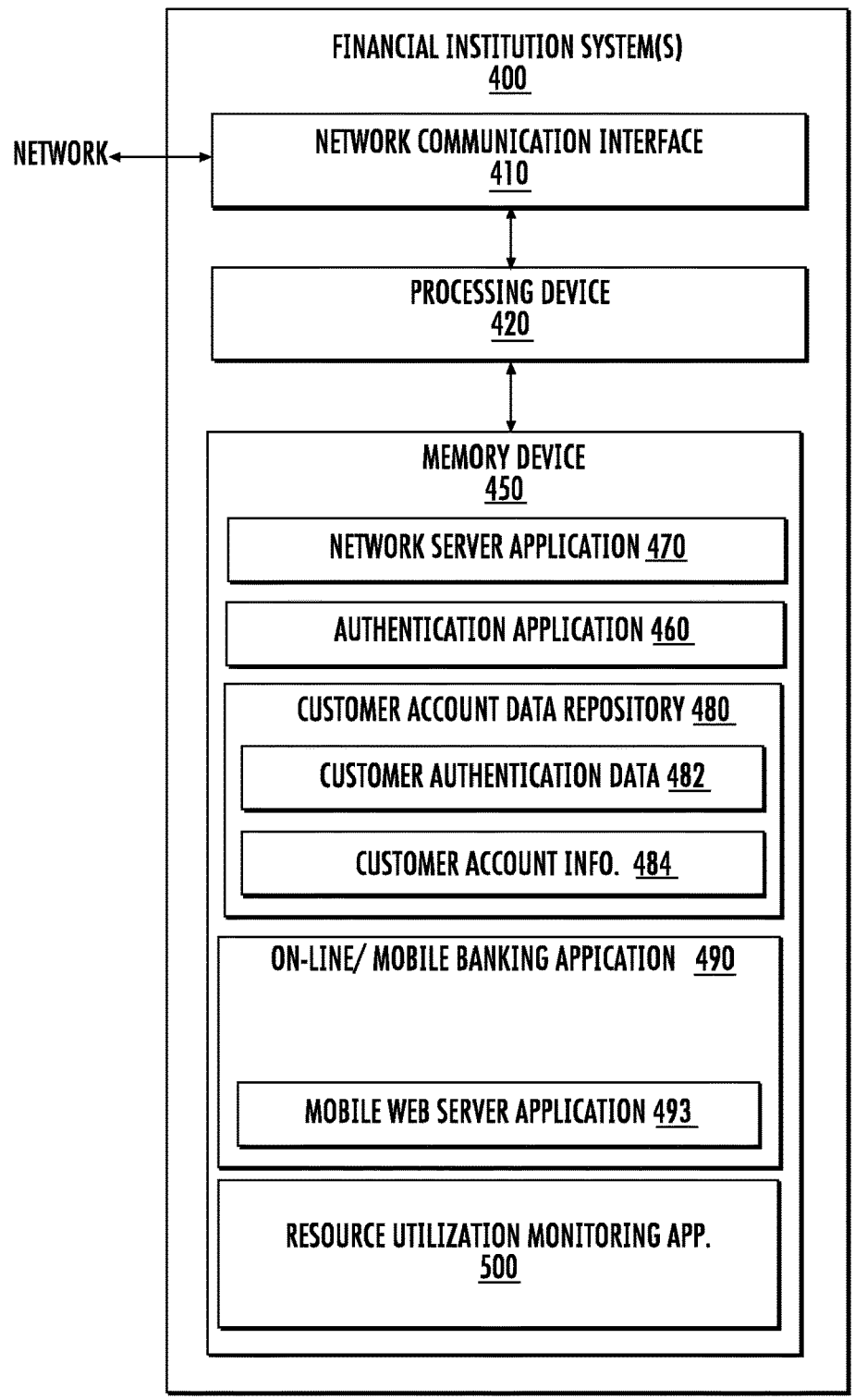
FIG. 4 is a block diagram illustrating the financial institution system of FIG. 1, in accordance with embodiments of the invention.

FIG. 4 provides a block diagram illustrating the entity system such as financial institution system 400, in greater detail, in accordance with embodiments of the invention. As illustrated in FIG. 4, in one embodiment of the invention, the financial institution system 400 includes one or more processing devices 420 operatively coupled to one or more network communication interfaces 410 and at least one memory device 450. In certain embodiments, the financial institution system 400 is operated by an entity, such as a financial institution.

It should be understood that the memory device 450 may include one or more databases or other data structures/repositories. The memory device 450 also includes computer-executable program code that instructs the processing device 420 to operate the network communication interface 410 to perform certain communication functions of the financial institution system 400 described herein. For example, in one embodiment of the financial institution system 400, the memory device 450 includes, but is not limited to, a network server application 470, an authentication application 460, a customer account data repository 480 which includes customer authentication data 480 and customer account information 484, a mobile banking application 490 comprising a mobile web server application 493, and other computer-executable instructions or other data. The computer-executable program code of the network server application 470, the authentication application 460, or the mobile banking application 490 may instruct the processing device 420 to perform certain logic, data-processing, and data-storing functions of the financial institution system(s) 400 described herein, as well as communication functions of the financial institution system(s) 400. The mobile banking application 490 communicates with the user computing devices 120 to facilitate communication between the user and the financial institution.

In one embodiment, the customer account data repository 480 includes customer authentication data 482 and customer account information 484. The network server application 470, the authentication application 460, and the mobile banking application 490 are configured to invoke or use the customer account information 484, the customer authentication data 482 when authenticating a user to the financial institution system(s) 400.

The financial institution system 400 further includes a resource utilization monitoring and validation application 500 that communicates with the user's computing devices 120. The resource utilization monitoring and validation application 500 functions to monitor a user's utilization of resources such as the user's utilization of the financial institution's on-line and/or mobile banking applications that are available to the user at the user device 120. The entity system applications such as the financial institution's on-line and/or mobile banking applications available for use by the user computing devices 120 are referred to as "resource applications".

As used herein, a "communication interface" generally includes a modem, server, transceiver, and/or other device for communicating with other devices on a network. The network communication interface 410 is a communication interface having one or more communication devices configured to communicate with one or more other devices on the network 150, such as the mobile device 200, and/or the personal computing device 300. The processing device 420 is configured to use the network communication interface 410 to transmit and/or receive data and/or commands to and/or from the other devices connected to the network 150.

The environment also comprises at least one financial center 600, FIG. 1, that are related to and may form part of the financial institution that operates and controls the financial institution system 400. The financial center(s) 600 may be a branch office, an ATM machine or other type of facility that provides in-person customer service and support for the financial institution. Typically, the financial institution system 400 comprises a plurality of financial centers that are geographically dispersed to provide services to the financial institution's customers over a wide, and potentially international, geographic area. The financial centers 600 may include at least portions of the financial institution systems 400 that allow each financial center 600 to communicate with other elements of the financial institution system 400 and the user devices 120 over network 150. Each financial center 600 may have access to all or a portion of the financial institution system(s) 400 such that each financial center 600 can communicate with and access at least portions of the processing device 420 and memory device 450 of the financial institution system and in some embodiments the various local systems of the financial centers 600 may be considered to be part of a distributed financial institution system 400. Thus, while the financial centers 600 may be geographically distributed, the financial centers 600 may be considered to form part of the financial institution system(s) 400 as previously described. Each financial center 600 typically includes local processing devices 420 and memory devices 450 and network interface devices 410 that allow the local system of the financial centers 600 to communicate over the network 150 with one another and with centralized systems of the financial institution. The financial centers 600 may also comprise a local customer account data repository, a local online/mobile banking application, a local resource utilization and monitoring application to facilitate communication, data management and security among the financial centers.

In a typical relationship the user is a customer of the financial institution and engages the financial institution for a variety of services and products. The user may have relationships with more than one financial institution and the relationship between each user and a financial institution may be different where different products and services are provided by the financial institution and/or utilized by the user. In a typical relationship the user may use some of the financial services and products on a regular basis and may use certain of the products and services infrequently or only once. In most relationships the user will utilize at least some of the services and products for a first time. Moreover, some products and/or services may require more complex interactions by the user or may be more complicated to complete. At least some of the products and services provided by a financial institution to its customers are provided through resource applications such as mobile and/or on-line banking applications 490.

An exemplary suite of mobile applications and/or on-line banking applications 490 may include some or all of, but is not limited to, of the following exemplary applications: money transfers, mobile/electronic check deposit, person-to-person payments (P2P), account statements (checking, savings, term deposits, loans card, equity/fund, insurance and the like), bill payment, cloud storage, cordless ATM withdrawl, pre-approved financing, portfolio management, stock quotes, personalized alerts, location based services, loyalty related agreements, and the like. A large and growing number of mobile and/or on-line banking applications are offered to the user where the user may use the different applications to obtain a variety of different services, perform a variety of different functions and effectuate a variety of different transactions. A user's access to and use of the applications 490 may change over time where some applications are utilized by the user on a regular basis while other applications are used less frequently. When a user utilizes an application infrequently the user may be less certain about how to utilize the application and may be uncertain as to whether the application is being used properly and whether the underlying transaction has been completed successfully. In order to assist the user in utilizing mobile applications and/or on-line banking applications the resource utilization monitoring and validation application 500 of the invention has been developed.

Figure 5:
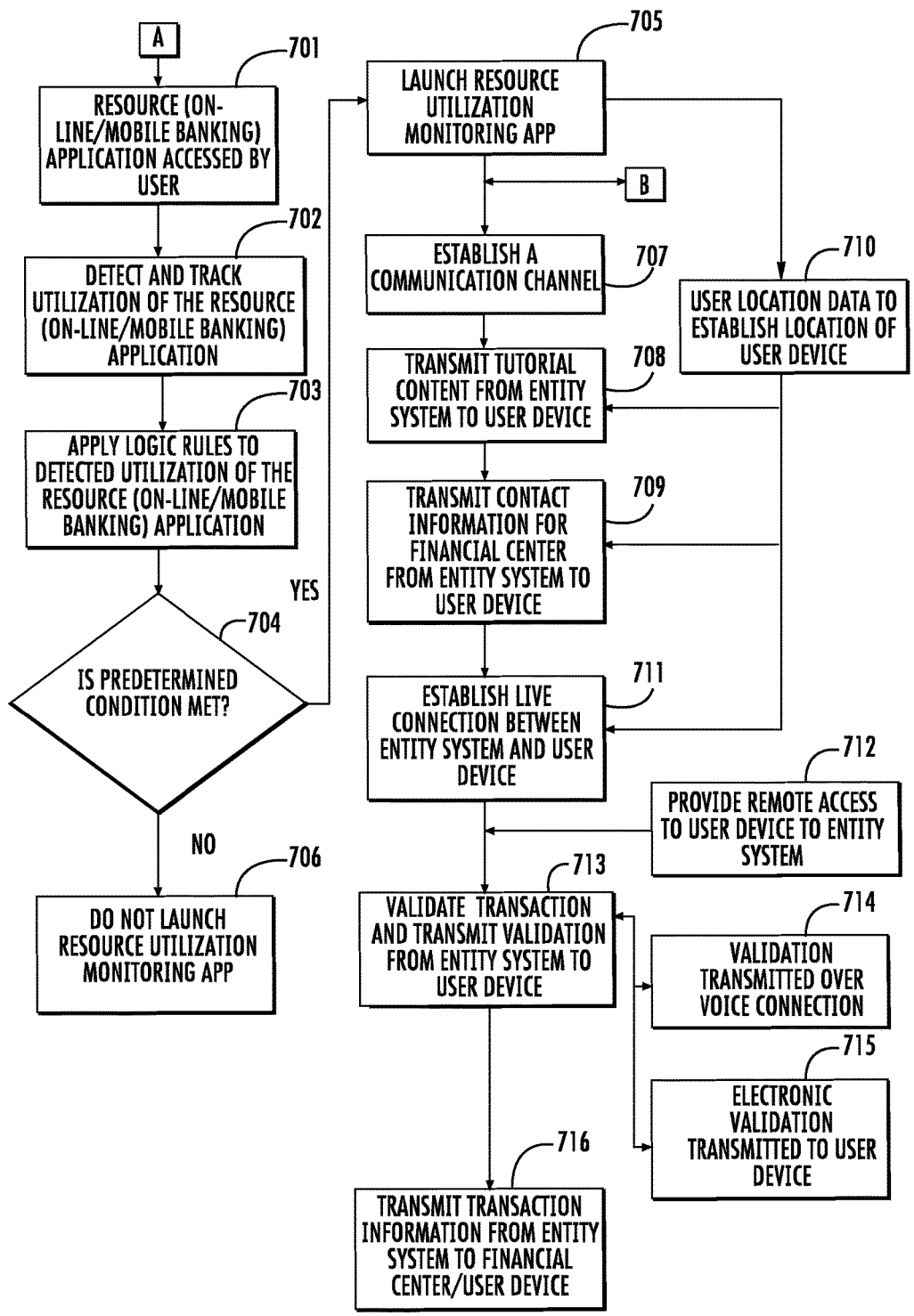
FIG. 5 is a flowchart illustrating methods for monitoring resource utilization and electronic validation, in accordance with embodiments of the invention.

An embodiment of the resource utilization monitoring and validation application will be described with reference to FIG. 5. In the illustrated embodiment of the system of the invention a user accesses a resource application such as an online/mobile banking application 490 of an entity such as a financial institution through the system of the entity such as financial institution system 400 (Block 701). The resource utilization monitoring and validation application 500 detects and tracks the user's access of the online/mobile banking applications 490 and monitors the user's utilization of the application (Block 702). The resource utilization monitoring and validation application 500 monitors a user's utilization of the applications 490 available to the user and applies logic rules to determine if the on-line or mobile application accessed by the user is an application that requires the full functionality of the resource utilization monitoring and validation application 500 (Block 704). For example, the resource utilization monitoring and validation application 500 may determine if the application 490 is a commonly utilized resource application or is an infrequently utilized application or an application utilized for the first time. Logic rules may be set up by the financial institution and retained in memory device 450 of the financial institution system 400 to determine if the full functionality of the resource utilization monitoring and validation application 500 is to be used. In some embodiments the resource utilization monitoring and validation application 500 detects and tracks a user's utilization of the online/mobile banking applications 490. In some embodiments the resource utilization monitoring and validation application 500 may track utilization of all online/mobile applications 490 available to the user. In other embodiments the resource utilization monitoring and validation application 500 may only track the utilization of a subset of the online/mobile applications 490 available to the user, such as more complicated applications or newly released applications. The resource utilization monitoring and validation application 500 may also detect the frequency utilization of an application such as how often per unit time an application is utilized by the user such that if an application has not been accessed for more than a predetermined period of time the functionality of the resource utilization monitoring and validation application 500 may be activated. For example, if a particular application 490 has not been accessed by the user in the past year the resource utilization monitoring and validation application 500 may be initiated upon utilization of that application by the user. In other embodiments, the system logic may only track and identify the first time an application 490 is utilized by a particular user. The rules may be set up to initiate the resource utilization monitoring and validation application 500 upon any set of predetermined conditions. The system determines if the user's utilization of an online/mobile banking application meets the predetermined conditions (Block 704). If the conditions are met the system initiates the full functionality of the resource utilization monitoring and validation application 500 (Block 705). If the conditions are not met, the online/mobile banking application 490 runs without the full functionality of the resource utilization monitoring and validation application 500 (Block 706).

As previously described, in some embodiments the system of the invention establishes rules for when the system of the invention will be launched for a particular user or for a class of users. In some embodiments the user may have input in establishing the rules; however, in some embodiments the rules may be established by the financial institution based on data accumulated by the financial institution. For example, the financial institution may track attempts to utilize a particular service and product provided in an online/mobile banking application 490 for its entire user base and it may determine that certain online/mobile banking applications 490 are more complicated and have a higher non-completion rate. In this embodiment the financial institution may track the non-completion rate for its online/mobile banking applications 490 to determine which online/mobile banking application 490 have the higher non-completion rates. In other embodiments, the financial institution may determine complexity of the transaction and monitor those online/mobile banking applications 490 that have more complex transactions. In one embodiment the full functionality of the resource utilization monitoring and validation application 500 is activated based on the personal experience of the user. The system may track the frequency with which a particular user utilizes a particular online/mobile banking applications 490 and may activate the full functionality of the resource utilization monitoring and validation application 500 when the utilization rate is below a predetermined level. For example, the system may be activated when the utilization rate falls below a predetermined utilization per unit time such that system of the invention may be activated the first time a particular online/mobile banking application 490 is utilized by the user or if the particular online/mobile banking application 490 has not been utilized by the user for a predetermined period of time (e.g. three months). The system may also be activated if the financial institution's data shows that a particular user has had problems when using a particular online/mobile banking applications 490 in the past. In this embodiment the financial institution may track the non-completion rate for its online/mobile banking applications 490 for the specific user to determine which online/mobile banking applications 490 have the higher non-completion rates for that user. In some embodiments the aggregated user data and the individual user data may be used together to determine when the system of the invention is initiated. For example, the financial institution may track the non-completion rate or utilization rate for a particular user for those online/mobile banking applications 490 that have a higher aggregate non-completion rate for all users. The full functionality of the system of the invention may also be activated at the request of the user. In such an embodiment an input such as a soft button may be provided on the user device 120 with the mobile/on-line banking application 221/356 that the user may click to initiate the full functionality of the system of the invention. Other rules and combinations of rules may be established in addition to those described herein.

If the system of the invention determines, based on the logic rules of the system that the full functionality of the resource utilization monitoring and validation application 500 is to be activated, the full functionality of the resource utilization monitoring and validation application is initiated. Upon initiation of the resource utilization monitoring and validation application 500, at least one communication channel 602 between the user device 120 and the financial institution system 400 may be opened (Block 707). The communication channel may be the same connection over which the online/mobile application 490 is being communicated between the financial institution system and the user device 120 or it may be a separate connection. For example, in one embodiment the communication channel 602 delivers on-line content to the user on the user device 120 and may be over the same data connection that runs the online/mobile application 490. The content may be in the form of text, images, video or a combination of different forms of content. The content may provide tutorials for utilizing the service or product, help menus, additional information as to how the product or service works or the like. In some embodiments the communication channel 602 may also provide a live connection to a person employed by or working with the financial institution such as personnel at a financial center 600 of the financial institution. In such an embodiment the communication channel may be a voice connection or it may be a video and voice connection while in some embodiments it may comprise a live text-only connection. The user device 120 may access the communication channel to obtain additional information regarding the operation and utilization of the online/mobile banking application 490.

When the logic rules dictate that the full functionality of resource utilization monitoring and validation application 500 is activated (Block 705), the resource utilization monitoring and validation application is initiated and provides instructions, feedback and validation to the user to facilitate the use of the online/mobile banking application 490. The resource utilization monitoring and validation application 500 may run in a separate window on the user computing device 120 or it may be integrated into the online/mobile banking application. The resource utilization monitoring and validation application 500 provides the user with detailed assistance for utilizing the online/mobile banking application 490. For example, the resource utilization monitoring and validation application may provide a tutorial and/or detailed step-by-step instructions for utilizing the online/mobile banking application (Block 708). These instructions may be significantly more detailed than the prompts and instructions normally provided with the online/mobile application such that the resource utilization monitoring and validation application provides enhanced guidance. For applications that the user utilizes on a more frequent basis the resource utilization monitoring and validation application is not activated and the detailed instructions and guidance are not provided.

In addition to providing detailed instructions the resource utilization monitoring and validation application may also provide contact information to the user (Block 709). The resource utilization monitoring and validation application 500 may provide the telephone number or other contact information for a local financial center 600, directions to the nearest, or user selected, financial center(s) and/or the telephone number or other contact information for a help desk. The contact information may be provided in the form of an active channel that may be selected on the user's computing device to connect the user to the local office or help desk. To select the designated financial center 600 for a particular user the resource utilization monitoring and validation application 500 may use the location information provided by the positioning system device 275 on user's mobile device 200 (Block 710). For a personal computing device 300 the contact information may for the financial center closest to the user's home or work place. In other embodiments the user may manually select a desired financial center.

In some embodiments the user may be automatically connected to the appropriate financial center 600 such that a live connection may be established to the user's computing device 120 (Block 711). The live connection may allow a live real-time conversation with personnel of the financial center 600 to guide the user through the online/mobile banking application 490. The financial center 600 may also be provided with remote access to the user's computing device 120 such that the financial center can observe and monitor the user's interaction with the online/mobile banking application 490 (Block 712). In one embodiment the connection is made to a person physically located at the user's home financial center 600 or at the financial center 600 that is physically closest to the user's current location using the positioning system device 275 on user's mobile device 200. In other embodiments user may be connected to a person at another location based on the service or product of the online/mobile banking application 490. For example, the connection may be made to personnel that have expertise in a particular transaction, product or service without regard to the user's physical location. Once the connection is established the user may interact with the financial center personnel to obtain live real-time assistance with the transaction. The personnel may be available to answer questions, provide guidance or otherwise assist in the completion of the transaction. In some embodiments a photograph of the person at the financial center may be sent to the user and/or a photograph of the user may be sent to the person at the financial center. The photographs and other identification information such as name, telephone number, e-mail address or the like of either the financial institution personnel or the user may be used to establish a personal relationship between the user and the person at the financial center.

In addition to the detailed instructions the resource utilization monitoring and validation application may also provide validation of the transaction to the user (Block 713). Upon completion of the transaction the financial center may validate with the user that the transaction has been successfully completed. The validation may be provided via the live real-time voice connection with personnel of the financial center (Block 714). An electronic validation may also be provided to the user device 120 by transmitting a validation code, validation message or other validation information from the financial system 400 to the user device electronically over the data connection (Block 715). The electronic validation may validate the completion of the entire transaction or it may validate successful completion of interim steps of the transaction such that multiple electronic validations may be transmitted for a single transaction.

In addition to providing detailed instructions and transaction validation the resource utilization monitoring and validation application may also be used to set up further interactions between the financial institution and the user. In one embodiment transaction information relating to the transaction of the resource application is transmitted from the financial institution system 400 to the designated financial center 600 and/or to the user computing device 120 (Block 716). For example, the resource utilization monitoring and validation application may schedule an appointment for the user at a designated financial center to complete the transaction and mat transmit documents or instructions or other information to that financial center that is sued by the financial center to complete the transaction with the user. As explained above the resource utilization monitoring and validation application may also transmit a code or other information to the user device 120 that may be used by the user to at the financial center to identify the transaction and validate the user's identity. The resource utilization monitoring and validation application may be used to initiate the creation of documents, financial instruments, cash payments or the like by the financial center. For example, the user may request a cashier's check or preapproved credit document or other document or financial instrument via an on-line banking application. The resource utilization monitoring and validation application may transmit information related to the transaction to a designated financial center. The requested document or financial instrument may be created at the designated financial center and the user may be instructed to go to that office to obtain the requested document or financial instrument. The user may then visit the designated office and provide confirmation or validation information such as a validation code and expeditiously receive the requested document or financial instrument. In some embodiments the information transmitted to the user and/or financial center personnel may comprise the photograph of the user and/or financial institution personnel such that when the user visits a financial center the user and financial center personnel may recognize one another and further establish a personal relationship.

Figure 6:
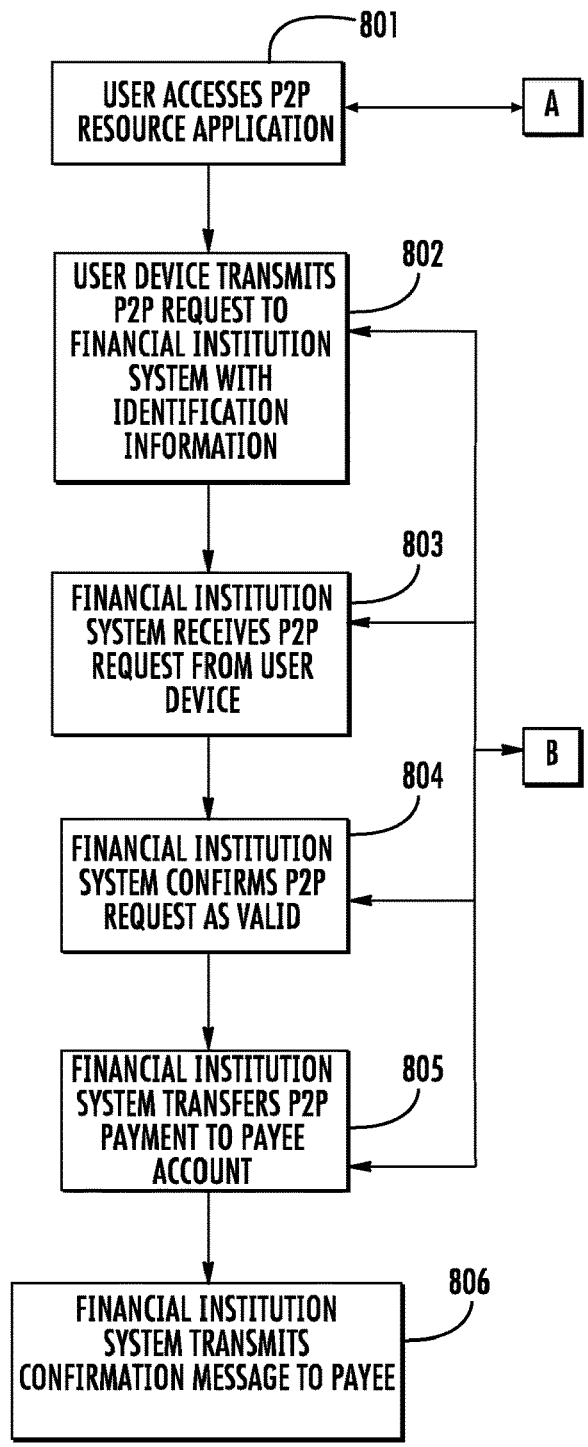
FIG. 6 is a flowchart illustrating a method for monitoring resource utilization and electronic validation, in accordance with embodiments of the invention.

An embodiment of an example online/mobile transaction will be described with reference to FIGS. 5 and 6. The embodiment shown in FIG. 6 relates to a person-to-person (P2P) payment transaction. In a person-to-person payment transaction the user is a customer of a financial institution that wants to make a payment to another entity using an on-line or mobile banking application. In some embodiments the entity receiving the payment may be required to be a customer of the financial institution or a customer of a financial institution that is approved by or on the P2P payment network of the user's financial institution; however, in some embodiments the entity receiving the payment may be unrelated to the financial institution of the customer.

The P2P payment may be initiated from the user device 120 accessing the on-line or mobile banking site of the user's financial institution and utilizing a P2P resource application (Block 801). In either event the user enters identification information such as name, mobile phone number or e-mail address, account number and the dollar amount of the transfer and transmits the request to the user financial institution (Block 802). The financial institution system 400 receives the P2P request (Block 803). The financial institution system 400 confirms the validity of the P2P request (Block 804). After confirming the validity of the request, the financial institution initiates the transfer of payment to the designated financial institution/account of the payee (Block 805). After the payment is completed, the financial system 400 transmits an e-mail or text message to the payee that alerts them of the payment and may provide instructions on how to confirm that the payment is posted to the correct account (Block 806). The first time the user and recipient use the service or as part of the P2P mobile application or on-line banking application, they may register their respective e-mail and/or phone numbers so it's associated with their respective designated accounts.

To describe the operation of the system of the invention the user is considered to be the person initiating the payment in the P2P application, the payor. In such a P2P application the recipient of the payment, the payee, may also be the user and the system of the invention may be initiated to assist the payee in addition to the payor. When the user initiates the P2P application the financial system resource utilization monitoring and validation application, using the rules that govern initiation of the application as described above, determines if the resource utilization monitoring and validation application is to be initiated (Block 701-704). For example, if the user is utilizing the P2P application for the first time the rules may direct the activation of the resource utilization monitoring and validation application. Other rules may also govern activation of the resource utilization monitoring and validation application as described above. If the conditions are met the system initiates the full functionality of the resource utilization monitoring and validation application 500 (Block 705). If the conditions are not met, the online/mobile banking application 490 runs without the full functionality of the resource utilization monitoring and validation application 500 (Block 706). When the resource utilization monitoring and validation application is launched a communication channel may be established (Block 707). The communication channel may be over the same connection as the application or it may comprise a separate connection. In one embodiment the communication channel delivers content to the user in the form of a tutorial explaining how the P2P application works and providing step-by-step instructions for making a payment using the P2P application (Block 708). The user receives the content on the user device and follows the step by step instructions to complete the P2P transaction.

The user may also be connected to a live person over a communication channel that provides voice and/or video communication with the user device. The live connection may provide additional tutorial for the user. In one embodiment the communication channel may connect the user device to the nearest financial center (Block 711). In this embodiment the resource utilization monitoring and validation application may receive location information from the user device and may use the location information to connect the user device to the nearest financial center (Block 710). The financial center may be provided with remote access to the user device such that the financial center is able to monitor the activity of the user to confirm verbally that the user is correctly using the application.

In addition to providing the tutorial services described above the communication channel may be used to provide validation of the transaction (Block 713-715). In some embodiments, a validation message may be sent to the user device at the completion of the transaction over the communication channel. In other embodiments the validation may be sent to the user over another communication channel such as by text or e-mail. The validation may also be provided to the user by the live connection that the validation is provided verbally. In some embodiments, a validation message may be sent to the user device at the completion of the transaction over the communication channel. In other embodiments the validation may be sent to the user over another communication channel such as by text or e-mail. The validation may also be provided to the user by the live communication channel such that the validation is provided verbally. The validation message and/or other communications between the user device and the financial institution system 400 may be transmitted at various steps during the transaction such that the user device 120 receives validation of each step of the transaction.

Figure 7:
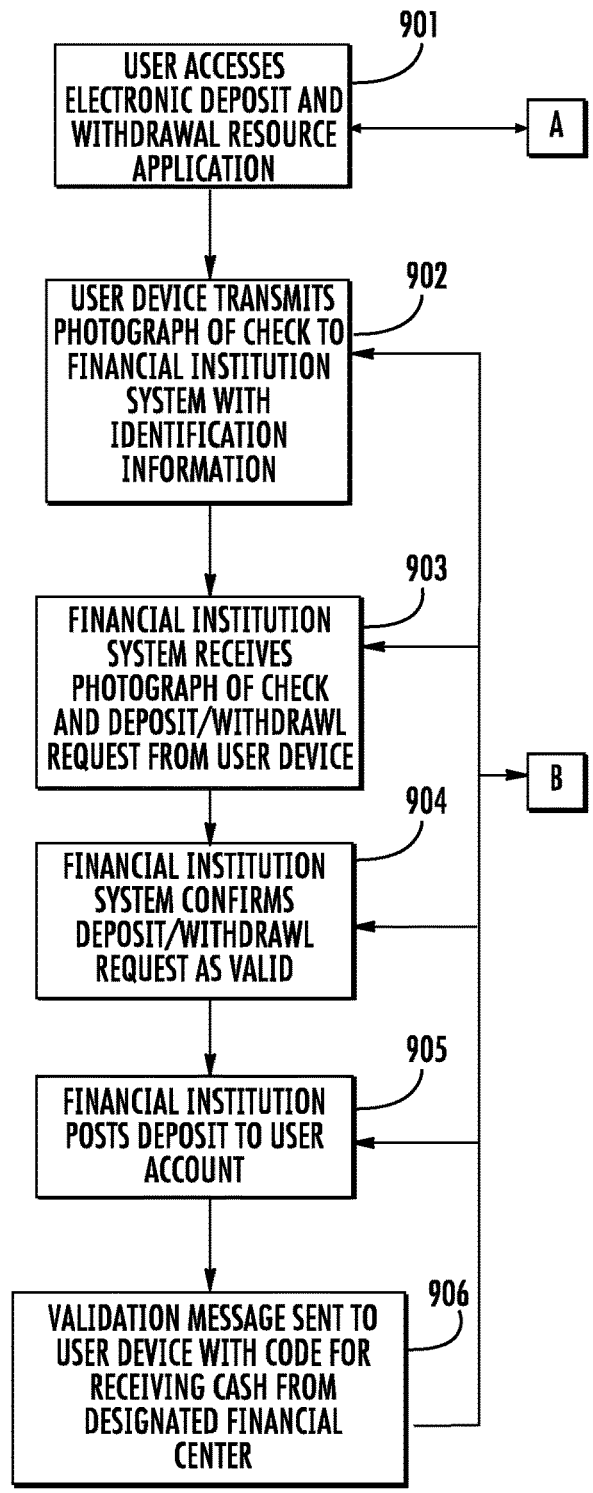
FIG. 7 is a flowchart illustrating a method for monitoring resource utilization and electronic validation, in accordance with embodiments of the invention.

An embodiment of an example transaction will be described with reference to FIGS. 5 and 7. The embodiment shown in FIG. 7 relates to a deposit and a cash withdrawl transaction. In a deposit and a cash withdrawl transaction the user may be a customer of a financial institution that wants to deposit a check using a resource application such as an on-line or mobile banking application and obtain cash back.

The deposit may be initiated from the user's mobile device by accessing the mobile application or mobile banking site of the user's financial institution or it can be initiated from financial institution web site on personal computing device 300 by utilizing the deposit and withdrawl resource application (Block 901). In either event the user transmits a photograph of the financial instrument being deposited, such as a check, and transmits the request for deposit with an identification of the user's account and any other identification information such as name, mobile phone number or e-mail address, and initiates the banking deposit application (Block 902). The financial institution receives the photograph and the request for deposit (Block 903). The financial institution confirms the request as valid (Block 904). The financial institution posts the deposited amount to the designated account of the user (Block 905). After the deposit is completed, the user receives a message that confirms the deposit to the correct account (Block 906).

To describe the operation of the system of the invention the user is considered to be the person making the deposit. When the user initiates the deposit the financial system resource utilization monitoring and validation application, using the rules that govern initiation of the application as described above, determines if the resource utilization monitoring and validation application is to be initiated (Block 701-704). For example, if the user is utilizing the deposit application for the first time the rules may direct the initiation of the resource utilization monitoring and validation application. Other rules may also govern activation of the resource utilization monitoring and validation application as described above. If the conditions are met the system initiates the full functionality of the resource utilization monitoring and validation application 500 (Block 705). If the conditions are not met, the online/mobile banking application 490 runs without the full functionality of the resource utilization monitoring and validation application 500 (Block 706). When the resource utilization monitoring and validation application is launched a communication channel may be established (Block 707). The communication channel may be over the same connection as the application or it may comprise a separate connection. In one embodiment the communication channel delivers content to the user in the form of a tutorial explaining how the deposit application works and providing step-by-step instructions for making a deposit using the online/mobile application (Block 708). The user receives the content on the user device and follows the step by step instructions to complete the deposit transaction.

The user may also be connected to a live person over a communication channel that provides voice and/or video communication with the user device. The live channel may provide additional tutorial for the user. In one embodiment the communication channel may connect the user device to the nearest financial center (Block 711). In this embodiment the resource utilization monitoring and validation application may receive location information from the user device and may use the location information to connect the user device to the nearest financial center (Block 710). The financial center may be provided with remote access to the user device such that the financial center is able to monitor the activity of the user to confirm verbally that the user is correctly using the application (Block 712).

In addition to providing the tutorial services described above the communication channel may be used to provide validation of the transaction (Block 713-715). In some embodiments, a validation message may be sent to the user device at the completion of the transaction over the communication channel. In other embodiments the validation may be sent to the user over another communication channel such as by text or e-mail. The validation may also be provided to the user by the live connection that the validation is provided verbally. In some embodiments, a validation message may be sent to the user device at the completion of the transaction over the communication channel. In other embodiments the validation may be sent to the user over another communication channel such as by text or e-mail. The validation may also be provided to the user by the live communication channel such that the validation is provided verbally. The validation message and/or other communications between the user device and the financial institution system 400 may be transmitted at various steps during the transaction such that the user device 120 receives validation of each step of the transaction.

The system of the invention may also be used to set up an appointment at a physical office of the financial institution or other physical location (Block 917). In this embodiment the resource utilization monitoring and validation application may receive location information from the user device (Block 710) and may use the location information to connect the user device to the nearest financial center (Block 711). The resource utilization monitoring and validation application may also send transaction information related to the transaction to the financial center (Block 716). The user may then go to the financial center to engage in related and/or additional transactions with the financial institution. In the current embodiment the user may go to the financial center to obtain the cash withdrawl from the financial institution. In one embodiment the system of the invention may provide the user with a code over the communication channel as part of the transaction validation step. The code may be used by the user at the financial center, such as a branch office or ATM machine, to obtain the cash withdrawl. In some embodiments that code may only be operable at selected locations. For example the code may only be operable at locations that are within a predetermined distance from the user's present location or from the user's home location, work location or other known location.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product on a computer-readable medium having computer-executable program code embodied in the medium. Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s).

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A entity system comprising:
a network communication interface;
a memory device storing a resource monitoring and utilization application and a resource application;
a processing device operatively coupled to the memory device, wherein the processing device is configured to execute computer-readable program code to:
monitor utilization of the resource application by a user on a user device;
apply logic based on a set of rules to determine if the utilization of the resource application requires full functionality of the resource monitoring and utilization application, wherein the set of rules are associated with utilization rate and non-completion rate of the resource application;
initiate the full functionality of the resource monitoring and utilization application on the user device based on determining that the utilization of the resource application requires the full functionality of the resource monitoring and utilization application by applying the logic;
in response to initiating the full functionality of the resource monitoring and utilization application, establish a communication channel between the user device and the entity system;
transmit control signals to the user device to dynamically display a graphical user interface of live content associated with the utilization of resource application from the entity system, wherein the live content is transmitted from the entity system to the user device via the communication channel; and
transmit an electronic validation that a transaction executed by the resource application is complete.

2. The system of claim 1, wherein transmitting the live content via the communication channel further comprises transmitting on-line content from the entity system to the user device.

3. The system of claim 2, wherein transmitting the live content via the communication channel further comprises transmitting contact information for a financial center to the user device, wherein the contact information for the financial center is based on a location of the user device.

4. The system of claim 1, wherein a financial center is provided remote access to the user device.

5. The system of claim 4, wherein the resource monitoring and utilization application transmits transaction information to the financial center usable by the financial center to complete a transaction at the financial center.

6. The system of claim 1, wherein the processing device is configured to execute computer-readable program code to detect and track utilization of at least a second resource application.

7. The system of claim 1, wherein the resource application comprises an online/mobile banking application.

8. The system of claim 1, wherein the set of rules are based on individual user data.

9. The system of claim 1, wherein the set of rules are on aggregated user data.

10. A method for monitoring utilization of a resource, the method comprising:
monitoring utilization of a resource application by a user on a user device;
applying logic based on a set of rules to determine if the utilization of the resource application requires full functionality of a resource monitoring and utilization application, wherein the set of rules are associated with utilization rate and non-completion rate of the resource application;
initiating the full functionality of the resource monitoring and utilization application on the user device based on determining that the utilization of the resource application requires the full functionality of the resource monitoring and utilization application;
in response to initiating the full functionality of the resource monitoring and utilization application, establishing a communication channel between the user device and an entity system;
transmitting control signals to the user device to dynamically display a graphical user interface of live content associated with the utilization of resource application from the entity system, wherein the live content is transmitted from the entity system to the user device via the communication channel; and
transmitting an electronic validation that a transaction of the resource application is complete.

11. The method of claim 10, transmitting contact information for a financial center to the user device based on a location of the user device.

12. The method of claim 11 transmitting transaction information from the entity system to the financial center usable by the financial center to complete a transaction at the financial center.

13. The method of claim 10, providing remote access to the user device to the entity system.

14. The method of claim 10, transmitting an electronic validation message from the entity system to the user device confirming a transaction executed by the resource application.

15. The method of claim 10, wherein the set of rules are based on individual user data.

16. The method of claim 10, wherein the resource application comprises an online/mobile banking application and the entity system comprises a financial institution system.

17. The method of claim 10, wherein transmitting the live content further comprises communicating on-line content from the entity system to the user device.

18. A computer program product located on a non-transitory computer readable medium for monitoring utilization of a resource, said computer program product comprising instructions for operation by one or more computing devices processors, said instructions comprising:
monitoring utilization of a resource application by a user on a user device;
applying logic based on a set of rules to determine if the utilization of the resource application requires full functionality of a resource monitoring and utilization application, wherein the set of rules are associated with utilization rate and non-completion rate of the resource application;
initiating the full functionality of the resource monitoring and utilization application on the user device based on determining that the utilization of the resource application requires the full functionality of the resource monitoring and utilization application;

in response to initiating the full functionality of the resource monitoring and utilization application, establishing a communication channel between the user device and an entity system;

transmitting control signals to the user device to dynamically display a graphical user interface of live content associated with the utilization of resource application from the entity system, wherein the live content is transmitted from the entity system to the user device via the communication channel; and transmitting an electronic validation that a transaction of the resource application is complete.

19. The computer program product of claim 18, wherein the instructions further comprises detecting and tracking utilization of at least a second resource application.

20. The computer program product of claim 18, wherein the resource application comprises an online/mobile banking application.

* * * * *